Feb. 18, 1930. R. R. TWEED 1,747,850
HORSESHOE
Filed Feb. 27, 1929
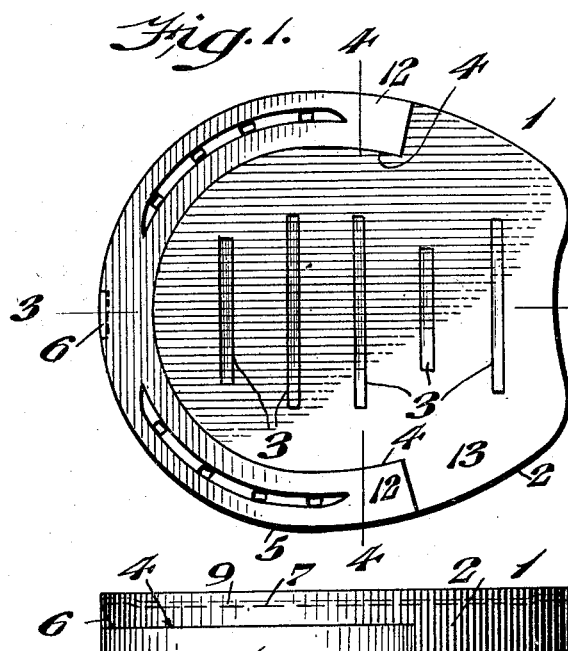
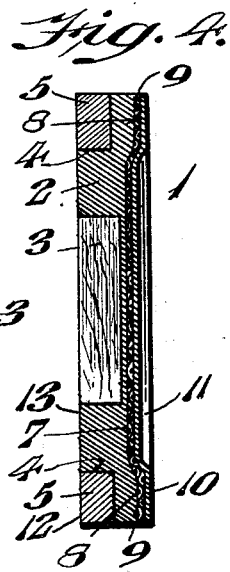
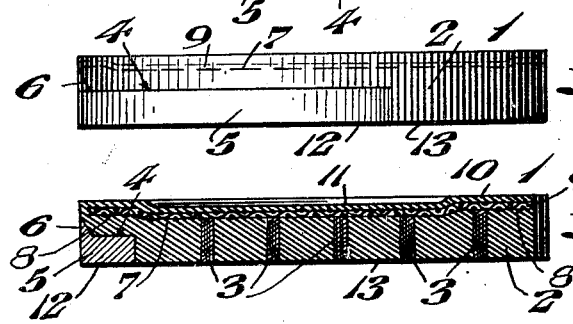
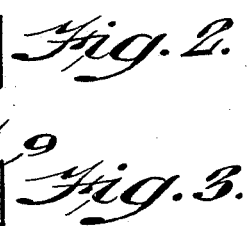
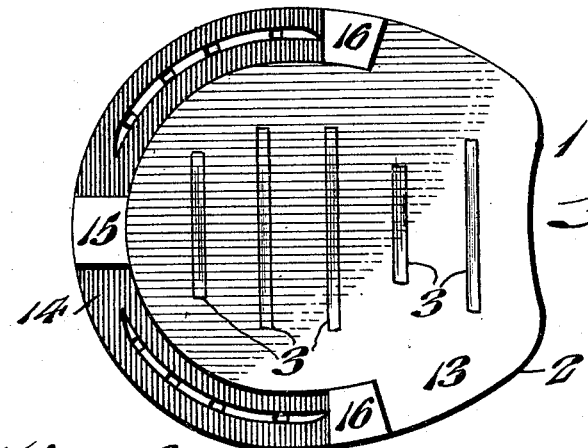
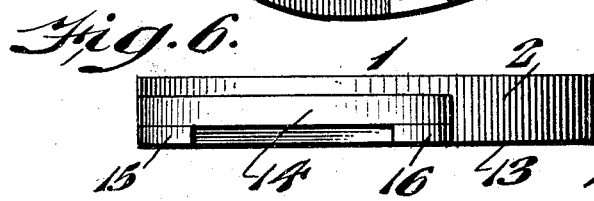
INVENTOR
ROBERT R. TWEED,
BY
Wiedersheim Fairbanks
ATTORNEYS.

Patented Feb. 18, 1930

1,747,850

UNITED STATES PATENT OFFICE

ROBERT R. TWEED, OF AUDUBON, NEW JERSEY

HORSESHOE

Application filed February 27, 1929. Serial No. 343,025.

My invention relates to a novel construction of a horseshoe comprising a pad of rubber or similar material, a metal horseshoe embedded in the front and sides of the bottom of said paid, and transverse strips of canvas embedded in said pad, whereby a durable and effective hoof covering is provided, as the canvas prevents slipping on wet, snowy, and icy streets, the metal shoe prevents undue wear, and the rubber gives a cushion or spring to the animal's hoof, the positioning of the metal shoe at the bottom of the pad rendering it easier to make the necessary adjustments to different hoof formations.

It further consists of a novel shoe possessing the above characteristics, and provided with a depression at the top surface to accommodate the animal's frog, said depression having one or more layers of textile material cemented or otherwise secured thereto.

My invention further consists of other novel features of construction and advantage, as will be hereinafter pointed out in the specification and claims appended hereto.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1 represents a bottom plan view of a horseshoe embodying my invention.

Fig. 2 represents a side elevation of Fig. 1.

Fig. 3 represents a longitudinal section on line 3—3 of Fig. 1.

Fig. 4 represents a transverse section on line 4—4 of Fig. 1.

Fig. 5 represents a bottom plan view of a slightly modified construction.

Fig. 6 represents a side elevation of Fig. 5.

Similar numerals of reference indicate corresponding parts.

Referring first to Figs. 1 to 4, 1 designates my novel horseshoe, the same comprising a pad or body portion 2 composed of rubber or its equivalent of substantially the configuration seen in Fig. 1, which is adapted to cover and protect the entire bottom of the animal's hoof, said body having embedded therein transverse strips of canvas or similar textile material 3, which is doubled or folded upon itself, as will be understood from Fig. 3. The strips 3 are preferably of varying lengths, as will be understood from Figs. 1 and 5. The bottom of the pad 2 at the front and outer portion thereof has a semicircular recess 4 formed therein, in which is seated the metal horseshoe 5, the extent and contour of which will be understood from Fig. 1, said horseshoe being formed with the toe piece 6, which is seated or fitted into the front of the pad 2, as will be understood from the left-hand end of Fig. 3. The bottoms of the strips are flush with the bottom of the pad. The top of the shoe or pad has a depression 7 formed therein, the extent and contour of which will be understood from Figs. 3 and 4, said depression receiving the frog of the hoof, and merging into the outer marginal slightly raised portion 8, as will be understood from Figs. 3 and 4. Upon the portions 7 and 8 I cement or otherwise secure a strip of canvas or similar tough fabric 9 with its ends extending beneath the annular wall 8 which I cover with the outer or upper covering 10 of suitable fabric, there being an outer depression 11 formed on the top of the pad as indicated in Figs. 3 and 4. In the construction seen in Figs. 1 to 4 I make the shoe 5 of very hard steel to withstand wear, as where a horse is inclined to walk on the side of its foot or to scuff when putting the foot down, and the bottom surfaces 12 and 13 of the shoe and pad respectively are coincident or substantially flush and in the same rectilinear plane or level. By my novel collocation of hard steel shoe, and strips of canvas on edge, and the rubber pad, a durable and effective construction is provided, the steel preventing wear at the front and sides of the pad, the canvas strips which soon wear down to contact with the pavement preventing slipping on wet, icy, or snowy streets, while the rubber pad takes the jar and shock off the horse's feet. By placing the steel shoe 5 at the bottom of the pad, it is easier to make the necessary adjustments to different formations of the hoof, and the rubber being positioned between the steel shoe and hoof gives a cushion or spring to the hoof, as is evident.

The construction seen in Figs. 5 and 6 is substantially the same as that already described, except that I have made the steel shoe designated at 14, a little thinner than the shoe 5 already described, and have provided the same with toe calk 15 and the heel calks 16, the bottoms of the latter being flush with the bottom surface 13 of the rubber pad 2. The construction seen in Figs. 5 and 6 is otherwise the same as that already described.

It will be understood that the pad 2 may be made of other materials than rubber which possess the requisite resiliency and toughness, and that other materials than canvas may be employed for the transverse strips 3, whose lower ends are coincident with the bottom surface 13 of the pad 2, so that they contact with the pavement at all times to prevent slippage. It will be apparent also that a single layer of canvas or other fabric 9 may be employed if desired.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent, is:

1. In a device of the character described, a resilient pad conforming to the contour of an animal's hoof, a metal horseshoe seated in the front and sides of the bottom thereof, so that its bottom portions are flush with the bottom surface of said pad, transverse strips of fabric embedded in the body of said pad and so arranged that their bottoms are flush with the bottom of the pad, there being a depression in the top of said pad to accommodate the frog of an animal's hoof, and a layer of fabric secured in the top of said pad, and beneath said depression but spaced therefrom by an upper covering.

2. In a device of the character described, a resilient pad conforming to the contour of an animal's hoof, a metal horseshoe seated in the front and sides of the bottom thereof so that its bottom portions are flush with the bottom surface of said pad, transverse strips of fabric embedded in the body of said pad and so arranged that their bottoms are flush with the bottom of the pad, there being a depression in the top of said pad merging into an outer raised annular wall, and a layer of fabric secured in the top of said pad beneath said depression and spaced therefrom, the ends of said fabric extending beneath said annular wall.

ROBERT R. TWEED.